(12) United States Patent
Betances Sansur et al.

(10) Patent No.: US 10,290,450 B1
(45) Date of Patent: May 14, 2019

(54) CIRCUIT BREAKERS WITH PLUG-ON NEUTRAL CONNECTION TO LOAD CENTER NEUTRAL BAR AND RELATED LOAD CENTERS AND METHODS

(71) Applicant: Eaton Intelligent Power Limited, Dublin (IE)

(72) Inventors: Luis Enrique Betances Sansur, Distrito Nacional (DO); Jeffrey Scott Gibson, Hookstown, PA (US); Modesto Rafael Rosario Perez, Santo Domingo Este (DO); Sujit Subhash Patwardhan, Pune (IN); Sandy Omar Jimenez, Monaca, PA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/840,360

(22) Filed: Dec. 13, 2017

(51) Int. Cl.
| | |
|---|---|
| *H01H 71/02* | (2006.01) |
| *H02B 1/052* | (2006.01) |
| *H01R 24/66* | (2011.01) |
| *H01H 71/24* | (2006.01) |
| *H01R 13/652* | (2006.01) |
| *H01R 13/18* | (2006.01) |
| *H01H 83/02* | (2006.01) |
| *H01H 83/22* | (2006.01) |
| *H01H 9/20* | (2006.01) |

(52) U.S. Cl.
CPC .... *H01H 71/0214* (2013.01); *H01H 71/0264* (2013.01); *H02B 1/052* (2013.01); *H01H 9/20* (2013.01); *H01H 71/2463* (2013.01); *H01H 83/02* (2013.01); *H01H 83/223* (2013.01); *H01H 2235/018* (2013.01); *H01R 13/18* (2013.01); *H01R 13/652* (2013.01); *H01R 24/66* (2013.01)

(58) Field of Classification Search
CPC .... H02B 1/04–1/0565; H01H 71/0264; H01H 71/2463; H01H 2235/018; H01H 71/0207; H01H 71/10; H01H 83/02; H01H 83/223; H01H 9/20; H01R 13/18; H01R 13/652; H01R 24/66
USPC ....... 361/634–636, 652–656, 673; 200/51 R, 200/43.11; 439/214, 652
See application file for complete search history.

(56) References Cited

U.S. PATENT DOCUMENTS

| | | | |
|---|---|---|---|
| 4,351,583 A * | 9/1982 | Belttary | H02B 1/056 439/839 |
| 4,743,204 A * | 5/1988 | Fromm | H01H 73/08 439/265 |
| 6,591,482 B1 | 7/2003 | Fleege et al. | |
| 7,957,122 B2 | 6/2011 | Sharp | |

(Continued)

OTHER PUBLICATIONS

ABB "SENTRICITY™ Loadcenters and Circuit Breakers: Raising the standard in residential" *Canadian Catalog, Product Brochure* (12 pages) (Aug. 2017).

(Continued)

*Primary Examiner* — Zachary Pape
(74) *Attorney, Agent, or Firm* — Myers Bigel, P.A.

(57) ABSTRACT

Plug-on neutral circuit breakers include a housing, a plug-on neutral clip with a crown held in the housing and with legs extending out from the housing and in communication with a biasing member that resides at least partially in the housing that allows the plug-on neutral clip to move between first and second positions associated with pre-installed and fully installed orientations.

20 Claims, 15 Drawing Sheets

(56) References Cited

U.S. PATENT DOCUMENTS

| | | | |
|---|---|---|---|
| 8,049,126 B2 * | 11/2011 | Chen | H01H 71/08 |
| | | | 200/244 |
| 9,048,054 B2 * | 6/2015 | Potratz | H01H 83/02 |
| 9,112,336 B2 | 8/2015 | Samuelson | |
| 9,184,525 B1 * | 11/2015 | Ranta | H01R 13/20 |
| 9,666,398 B2 * | 5/2017 | Robinson | H01H 71/0207 |
| 10,020,152 B2 * | 7/2018 | Pearson | H01H 9/20 |
| 2008/0289938 A1 * | 11/2008 | Raabe | H01H 71/0207 |
| | | | 200/238 |

OTHER PUBLICATIONS

Square D "Plug-on Neutral Load Centers with Qwick-Grip Wire Management System" *Product Brochure*, www.schneider-electric.us/gg (8 pages) (2017).

\* cited by examiner

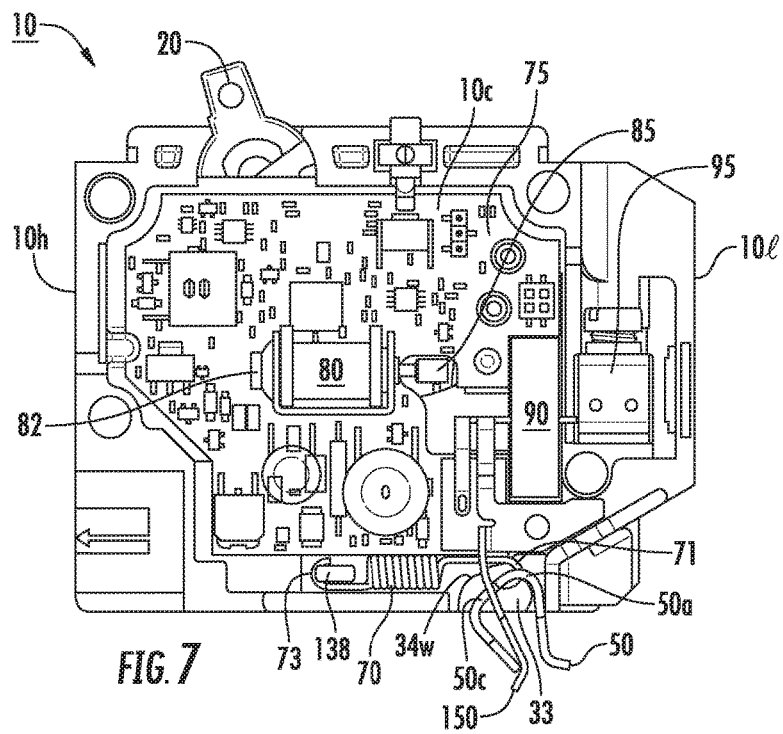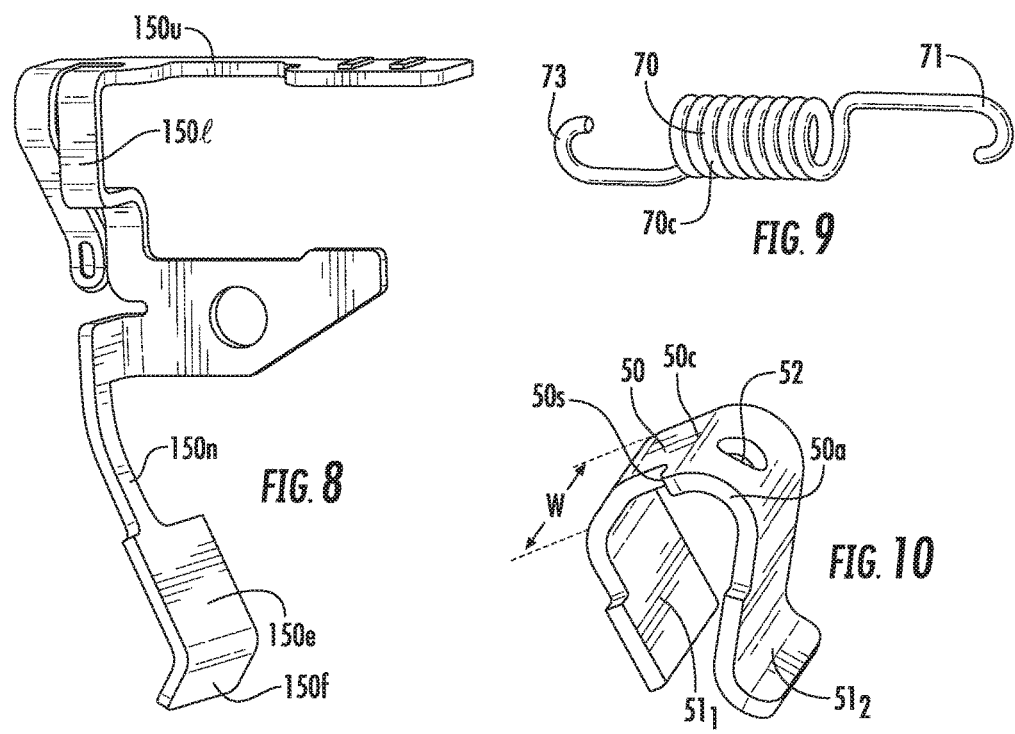

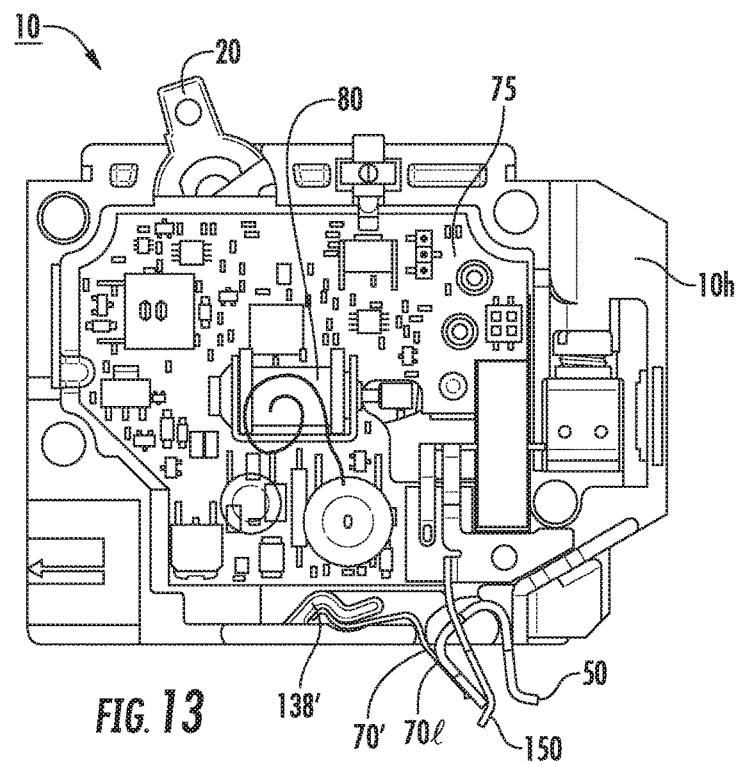
FIG. 13
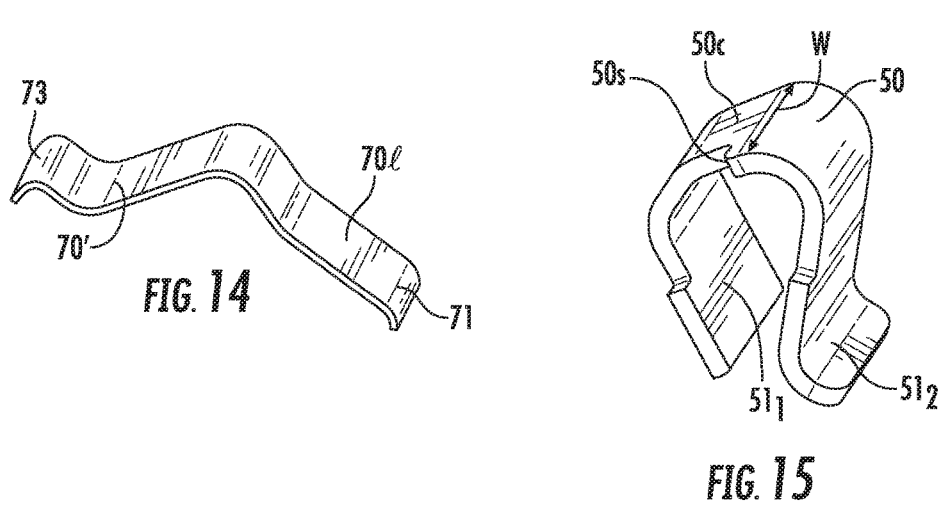
FIG. 14
FIG. 15

CIRCUIT BREAKERS WITH PLUG-ON NEUTRAL CONNECTION TO LOAD CENTER NEUTRAL BAR AND RELATED LOAD CENTERS AND METHODS

FIELD OF THE INVENTION

The present disclosure relates to plug-on neutral breakers.

BACKGROUND OF THE INVENTION

Arc Fault Circuit Interrupters (AFCI) and Ground Fault Circuit Interrupters (GFCI) are among a variety of overcurrent protection devices used for circuit protection and isolation. Arc Fault Circuit Interrupters (AFCIs) reduce fire hazards in electrical circuits by reducing the effects of high current arcing faults (parallel arcs) as well as detecting persistent low-current arcing faults (series arcs). Ground Fault Circuit Interrupters reduce the potential of electrical shock. Dual purpose AFCI/GFCI breakers are available which provide GFCI protection and AFCI protection as combination type breakers from Eaton Corporation. Both branch feeder and combination AFCIs provide conventional thermal and magnetic overcurrent protection. Both also provide high current or "parallel" arcing fault detection and fire mitigation for installed wiring and connected cords.

Load centers and similar devices can be configured with neutral bars that allow neutral terminal connections using neutral plug-on clips of circuit breakers.

SUMMARY OF EMBODIMENTS OF THE INVENTION

Embodiments of the present invention provide circuit breakers with a plug-on neutral clip and biasing member coupled to the clip to return the clip to a first pre-installed position when detached from a load center.

Embodiments of the present invention are directed to circuit breakers that include: a housing; a neutral bus held by the housing with a first end portion extending out of the housing; and a plug-on neutral clip slidably held by the housing. The plug-on neutral clip includes a crown held in the housing and first and second spaced apart legs extending out from the housing. The first leg is adjacent the first end portion of the neutral bus. The plug-on neutral clip and the first end portion of the neutral bus are configured to move between a first position associated with an uninstalled circuit breaker orientation and a second position associated with a fully installed circuit breaker orientation. The circuit breakers also include a biasing member coupled to the plug-on neutral clip and held in the housing. The biasing member is configured to return the plug-on neutral clip and the first end portion of the neutral bus back to the first position from the second position when the plug-on neutral clip is detached from a neutral bus bar of a load center.

The circuit breaker can further include a projection member held by the housing and an open channel surrounding the projection member. The crown can be held by the projection member and the first and second legs can extend out of the housing through the open channel.

The circuit breaker can also include an external outwardly facing projection that is perpendicular to a wall of the housing surrounding the open channel and that is configured to engage a foot held by a backpan of a load center to thereby allow the circuit breaker to rotate toward the backpan of the load center during installation.

The projection member can have an arcuate perimeter.

The open channel can be bounded by a wall segment that has an arcuate portion that can slidably engage a line side facing end portion of the crown of the plug-on neutral clip in the second position and that can be spaced apart from the line side facing end portion of the crown of the plug-on neutral clip in the first position.

The biasing member can reside in the housing in a compartment of a middle base of the housing facing a top cover of the housing.

The biasing member can be a coil spring with a first end portion coupled to the crown of the plug-on neutral clip and an opposing second end portion coupled to the housing.

The crown can include an aperture and the first end portion of the biasing member can extend through the aperture to couple the biasing member to the crown of the plug-on clip.

The biasing member can be a leaf spring with a first end portion coupled to the plug-on neutral clip and an opposing second end portion trapped in the housing. The first end portion of the leaf spring can extend out of the housing.

The second end portion of the leaf spring can be held under a curvilinear anchor member in the housing.

The first end portion of the leaf spring can be planar and parallel to the first leg of the plug-on neutral clip.

The first leg of the plug-on clip can be shorter than the second leg of the plug-on clip. A foot of the neutral bus can extend inwardly under the first leg of the plug-on clip.

The breaker neutral bus can have a first portion that is held in the housing and can couple to a collar assembly. The breaker neutral bus can have a leg with a narrow segment that is more narrow than a second end portion with a foot. The crown of the plug-on neutral clip can have a width dimension that narrows from a load facing side to a line facing side at a stepped segment. The narrow segment of the neutral bus can extend through the stepped segment of the crown and can be held in a curvilinear configuration when the plug-on neutral clip is in the first position.

The circuit breaker can be a plug-on neutral type BR or CH circuit breaker or a dual purpose AFCI/GFCI.

Embodiments of the present invention can be directed to load centers that include the circuit breaker(s). The load center can have a wall holding a neutral bar and one or more line side stabs. The plug-on neutral clip can slidably engage the neutral bar. One or more terminals at a line side of the housing can engage the one or more line side stabs.

The circuit breaker can be configured to be rotatably attached to a wall panel of a load center. Once the plug-on neutral clip slidably engages the neutral bar, rotation of a line side of the housing of the circuit breaker into the one or more line stabs to a fully installed orientation can cause the plug-on neutral clip to push a segment of a breaker neutral bus against the load center neutral bus bar.

Yet other embodiments are directed to methods of orienting a neutral plug-on clip of a circuit breaker. The methods can include: providing a load center with at least one neutral bus bar; providing a circuit breaker with a plug-on neutral clip and a biasing member coupled thereto; attaching the plug-on neutral clip to one or more of the at least one neutral bus bar; slidably rotating the plug-on neutral clip while a crown thereof is held inside a housing of the circuit breaker and first and second legs thereof extend outside the housing from a first position associated with an uninstalled orientation to a second position associated with a fully installed orientation; and then detaching the circuit breaker from the load center whereby the biasing member automatically returns the plug-on neutral clip back to the first orientation.

The circuit breaker can also include a neutral bus with a leg that extends out of the housing and also engages the plug-on neutral clip. The attaching step can include forcing the leg against a respective neutral bar using the plug-on neutral clip. The detaching step can include forcing the leg of the neutral bus to return to a first position associated with a pre-installation orientation.

The method can include rotating a line side of the housing of the circuit breaker inward toward a line side stab or stabs after attaching the plug-on neutral clip to the one or more neutral bar causing the sliding rotation of the plug-on clip to the second position.

The slidably rotating can be carried out by sliding the crown upward and inward about a projection with a curved perimeter.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 7 is a side view of a portion of the circuit breaker shown in FIG. 1A according to embodiments of the present invention.

FIG. 8 is a greatly enlarged side perspective view of an example neutral bus of the circuit breaker shown in FIG. 1A according to embodiments of the present invention.

FIG. 9 is a greatly enlarged side perspective view of an example biasing member of the circuit breaker shown in FIG. 1A according to embodiments of the present invention.

FIG. 10 is a greatly enlarged side perspective view of an example plug-on neutral (spring) clip of the circuit breaker shown in FIG. 1A according to embodiments of the present invention.

FIG. 13 is a side view of a portion of the circuit breaker shown in FIG. 12 according to embodiments of the present invention.

FIG. 14 is an enlarged side perspective view of a biasing member according to embodiments of the present invention.

FIG. 15 is an enlarged side perspective view of a plug-on neutral (spring) clip according to embodiments of the present invention.

DETAILED DESCRIPTION OF EMBODIMENTS OF THE INVENTION

Figure 1A:
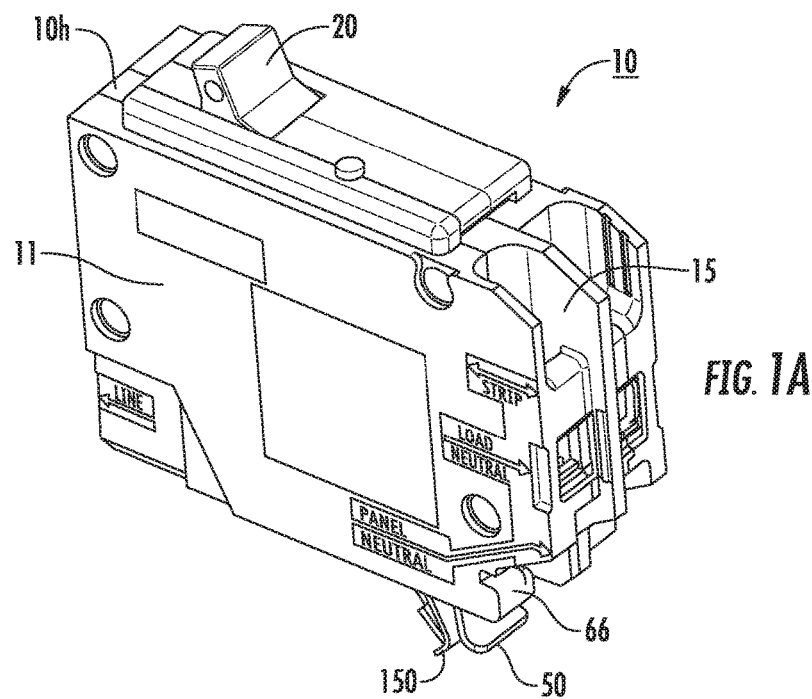
FIG. 1A is a side, top perspective view of an example circuit breaker according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'''). The terms "Fig." and "FIG." may be used interchangeably with the word "Figure" as abbreviations thereof in the specification and drawings. In the figures, certain layers, components or features may be exaggerated for clarity, and broken lines illustrate optional features or operations unless specified otherwise.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the invention are particularly suitable for electrical devices such as load centers or wall panels for electrical devices. The terms "load center" and "electrical distribution load center" refer to the collective components of an electrical distribution system and its respective housing that supplies electrical power to one or more subsidiary circuits. The terms "bus," "bus element," "electrical distribution bus," or "bus bar" refers to components in an electrical distribution system that conducts electricity within the load center.

Electrical load centers include electrical busses that comprise conductors permitting electrical current to be carried throughout the electrical load center. Electrical busses may contain features permitting attachment of fuses, relays, switches, wires, breakers, and other electrical elements. Load centers may contain one or more electrical busses in close proximity to one another, and insulating material or insulation may be used to avoid an arcing or shorting event occurring between the busses. Busses are electrically insulated from each other to avoid a phase-to-phase short circuit. Busses are also electrically insulated from the electrical load center enclosure to avoid a phase-to-ground short circuit. Some load centers also include branch circuit breakers connected to the electrical busses at specific points within the load centers. The location, orientation, and spacing of the bus elements and insulation elements within the load are arranged so as to prevent an arcing, overcurrent, or short circuit event once the busses are placed under load. The load centers typically include a backpan assembly with a backpan holding a bus structure attached to the back of the enclosure. See, e.g., U.S. Pat. No. 9,112,336, the contents of which are hereby incorporated by reference as if recited in full herein.

Figure 1B:
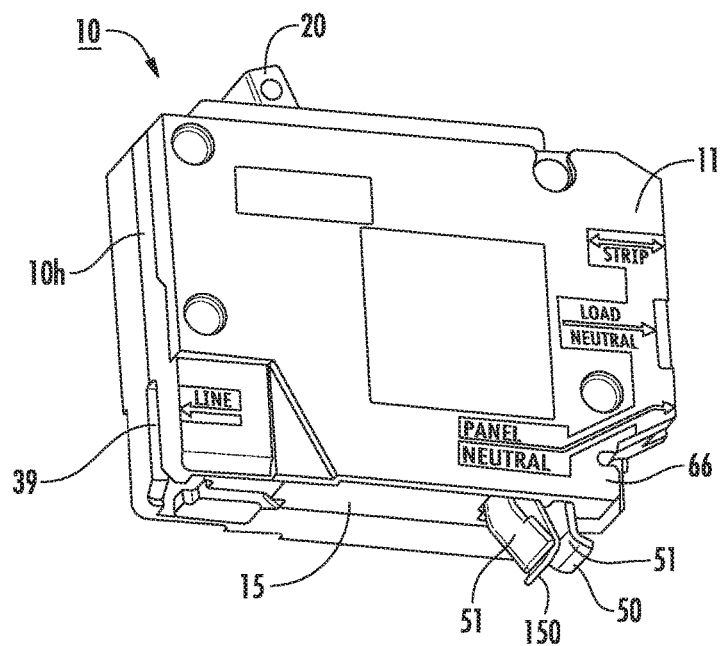
FIG. 1B is a rear perspective view of the example circuit breaker shown in FIG. 1A.
Figure 4:
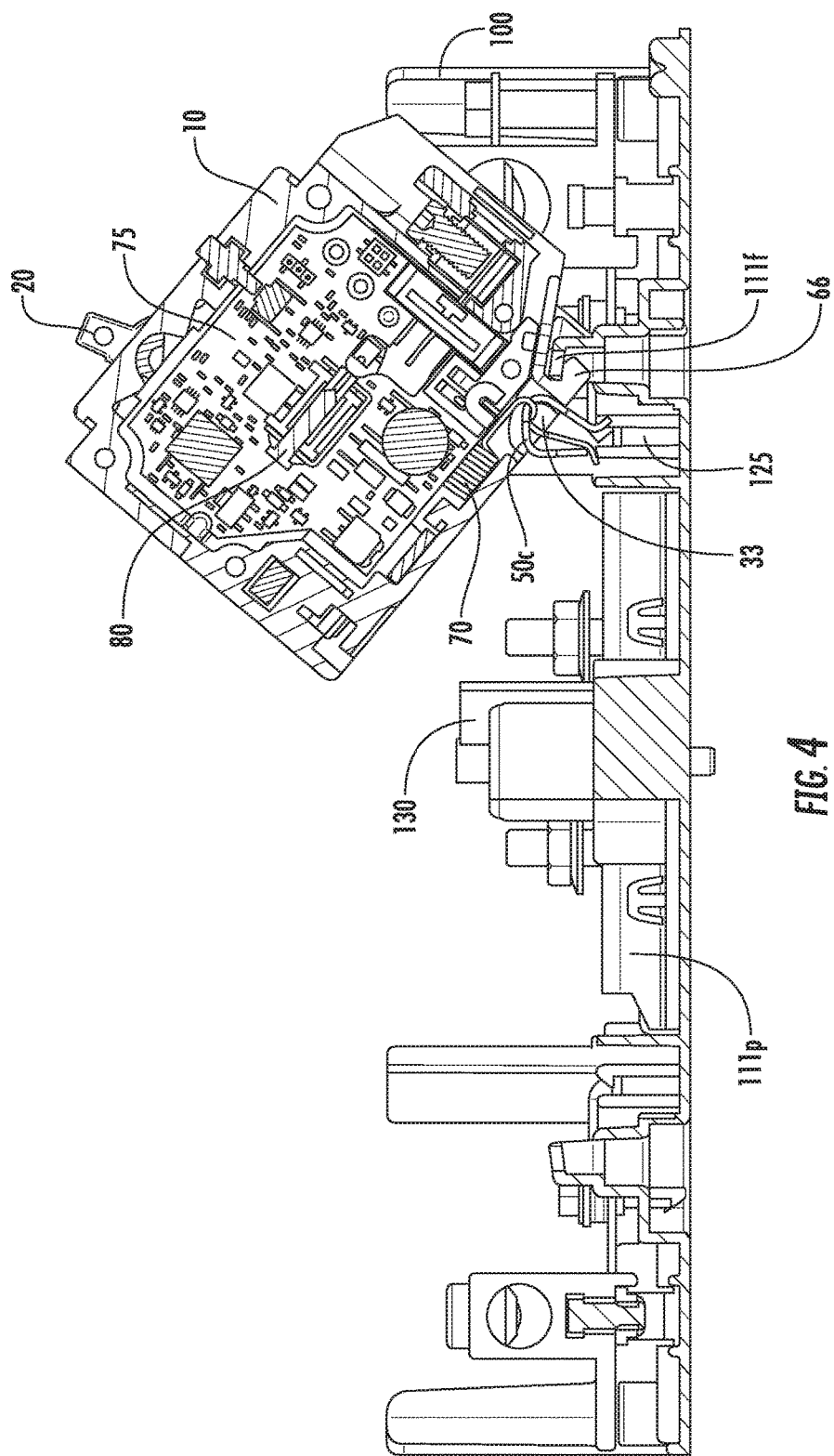
FIG. 4 is a side section view of the circuit breaker in a first position relative to the load center taken along line 4-4 of FIG. 3 (pre-installed or improperly installed) according to embodiments of the present invention.
Figure 5:
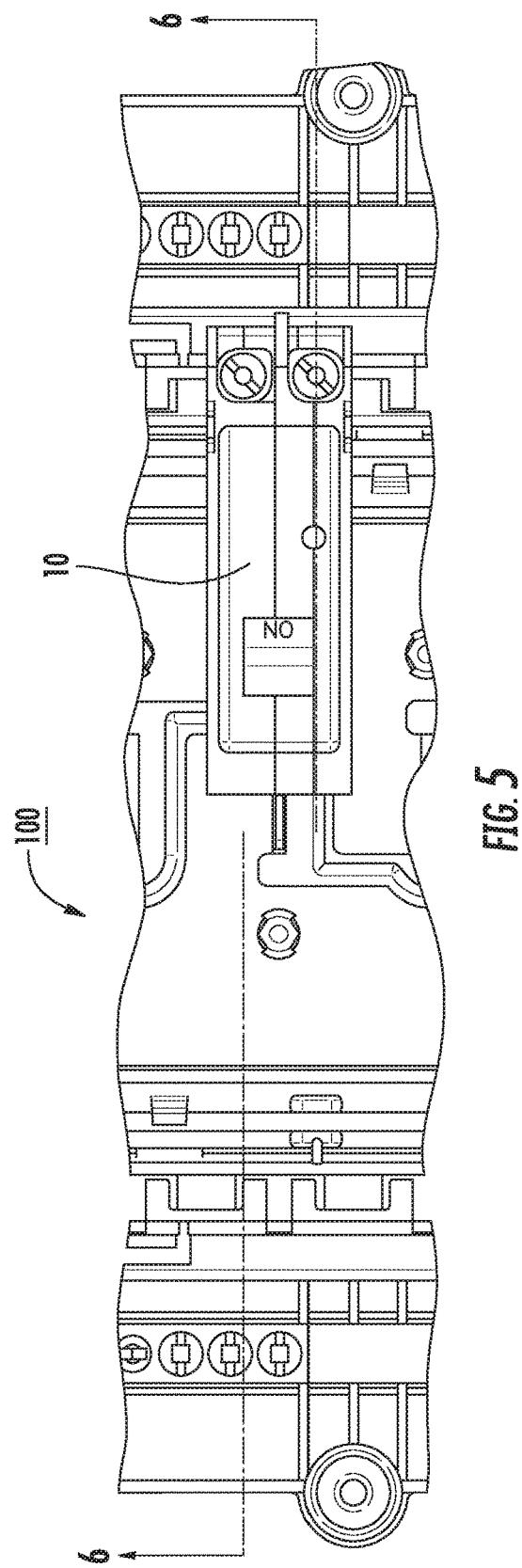
FIG. 5 is a partial view of the circuit breaker of FIG. 1A in a second position relative to the load center (properly coupled to the neutral bus bar of the load center of FIG. 2) according to embodiments of the present invention.

Referring to FIGS. 1A and 1B, an example circuit breaker 10 is shown. The circuit breaker 10 includes a housing 10h, a switch 20, plug-on neutral clip 50 and a neutral bus 150. As shown, the plug-on neutral clip 50 has first and second legs 51 that extend out of the housing 10h, one on each side of the neutral bus 150. The housing 10h can enclose the crown 50c (FIG. 4, for example). As shown, the housing 10h can include a top cover 11 and a middle base 15 that cooperate to enclose the crown 50c of the plug-on neutral clip 50 in a manner that allows the plug-on neutral clip 50 to slidably rotate between a fully installed orientation with the neutral bus bar 125 (FIG. 6) and a pre-installed orientation (FIG. 4) as will be discussed further below. Thus, the plug-on neutral clip 50 can have two extreme positions and can move from a first uninstalled position to a second installed position as the breaker housing 10h is rotated down onto the line stab 130 connection. The plug-on neutral clip 50 can be a spring clip.

Figure 2:
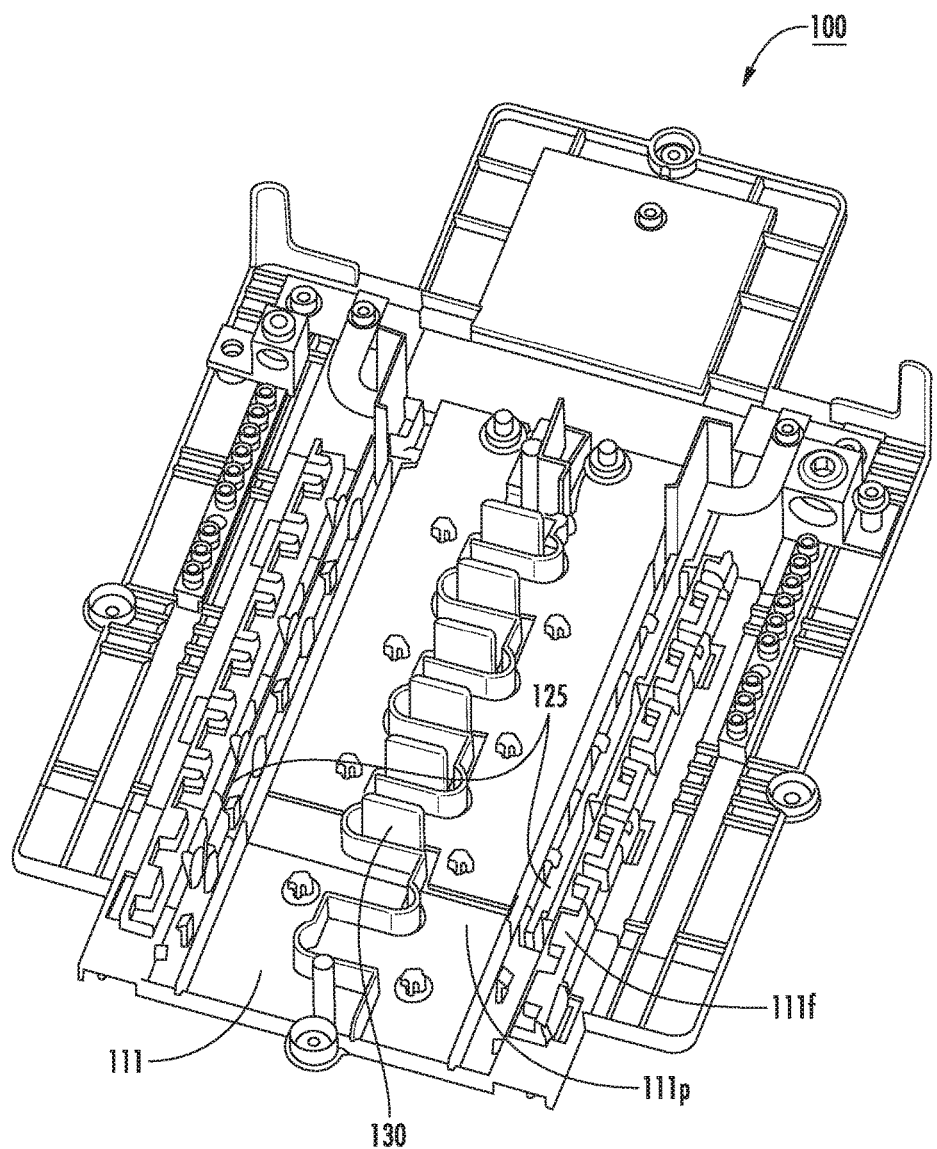
FIG. 2 is a top perspective view of an example load center according to embodiments of the present invention.
Figure 3:
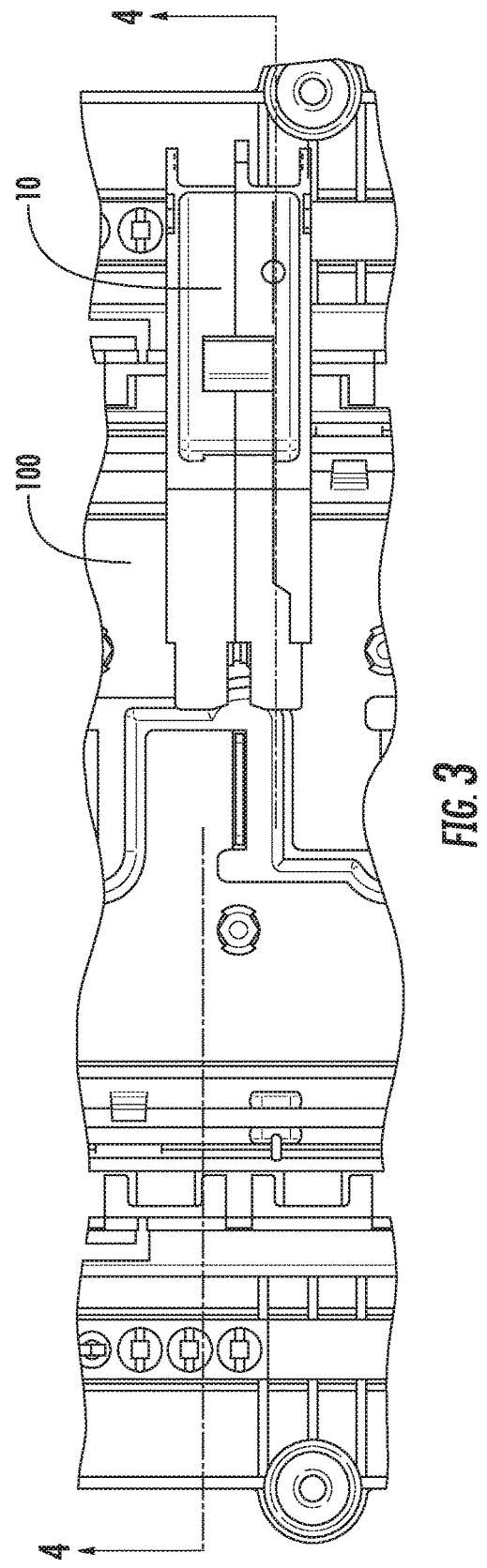
FIG. 3 is a partial view of the circuit breaker of FIG. 1A over a neutral bus bar of the load center of FIG. 2 according to embodiments of the present invention.

Referring now to FIG. 2, a wall panel 111 such as for a load center 100 that can engage one or more circuit breakers 10 is shown. The wall panel 111 includes a at least one line side stab 130 and at least one spaced apart neutral bar 125 (shown as left and right side parallel neutral bus bars). The circuit breaker 10 can include one or more line side terminals 39 (FIG. 1B) that electrically engage line side stabs 130 in the load center 100. The neutral bar 125 can have a rectangular shape with a straight outwardly extending planar body.

Figure 6:
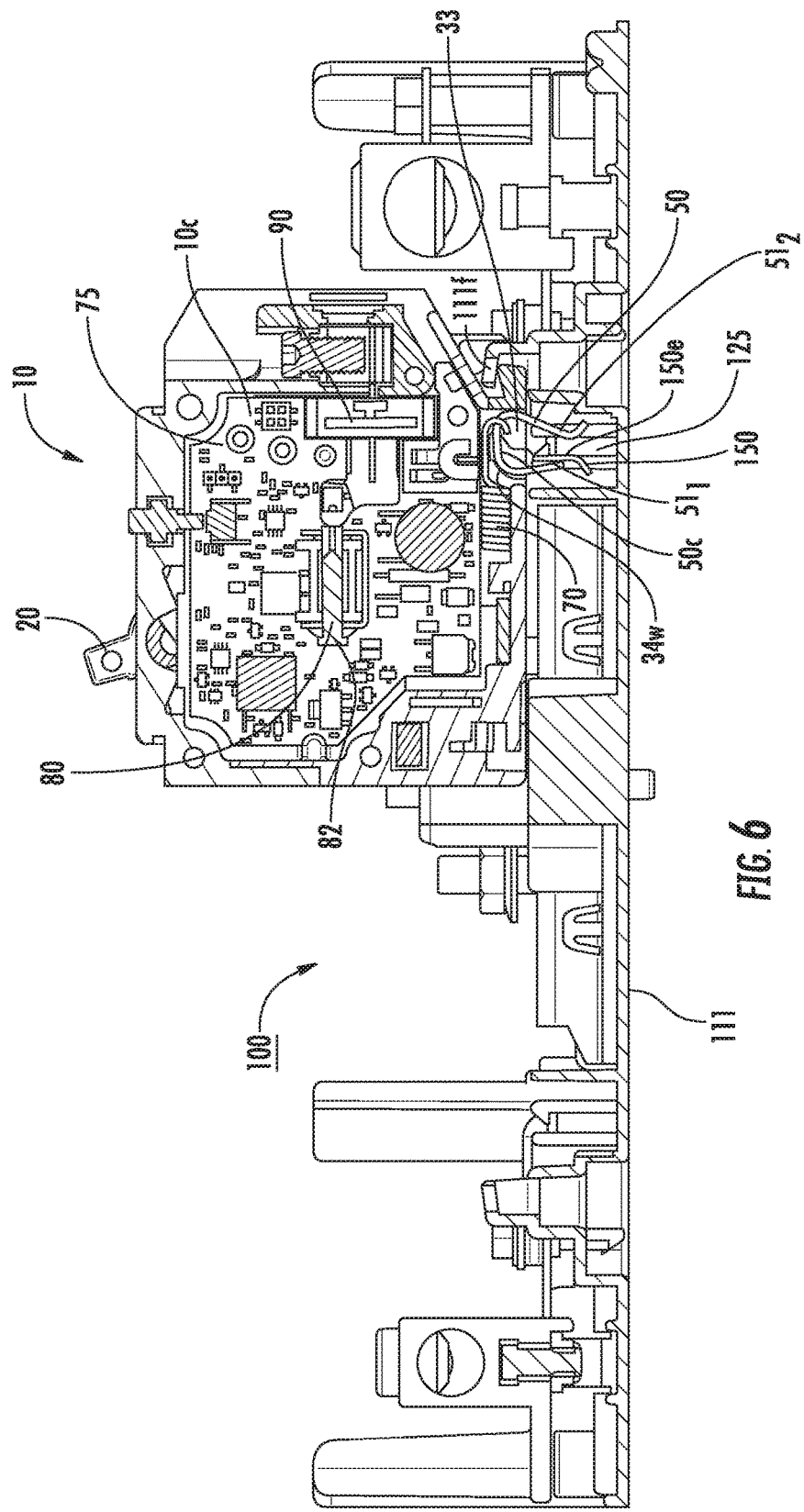
FIG. 6 is a side section view of the circuit breaker and load center taken along line 6-6 of FIG. 5 according to embodiments of the present invention.

As shown in FIGS. 4, 6 and 7, the circuit breaker 10 includes a biasing member 70 that is coupled to the plug-on neutral clip 50 that bias the plug-on neutral clip 50 to be in a first orientation when un-installed. The biasing member 70 can resiliently bias the plug-on neutral clip 50 to a first orientation or position (FIG. 4) associated with a pre-install configuration while allowing the plug-on neutral clip 50, and breaker neutral bus 150 to rotate to a fully installed position and/or orientation when the breaker is engaged to the load center panel backpan 111p (FIG. 6). The biasing member 70 can be provided by a coil spring 70c (FIG. 9) or other resilient members such as a leaf spring, a dome spring washer, a resilient plug or stacked dome spring washers, for example. The coil and leaf spring examples will be discussed further below.

Referring to FIGS. 4 and 6, the breaker 10 can be installed to the panel 111p by rotating the breaker 10 into an installed position. The breaker 10 can comprise an external projection 66 that is configured to hook a foot 111f on the backpan 111p and rotate to connect the breaker neutral bus 150 and clip 50 to the load center neutral bus bar 125 (FIG. 6). When the breaker 10 is un-installed or removed from a load center 100, the biasing member 70 can force the neutral bus 150 and clip 50 to the first position (FIG. 4), ready for installation.

As shown in FIGS. 4, 6 and 7, the circuit breaker 10 can enclose a printed circuit board 75 with a trip solenoid 80 and plunger 82 on one end of the solenoid and a plunger extension 85 on an opposing end facing the load side. The circuit breaker 10 can include a current transformer 90 and other circuit components of a circuit breaker circuit 10c.

Referring to FIGS. 4, 6, 7 and 11A, the housing 10h can include a projection member 33 that can slidably engage or hold a crown 50c of the plug-on neutral clip 50 while free legs 51 of the plug-on neutral clip 50 extend out from the housing 10h on opposing line and load facing sides of the projection member 33 to be able to reside on opposing sides of the neutral bar 125. The projection member 33 can have an arcuate and/or curvilinear perimeter. The crown 50c of the plug-on neutral clip 50 can rotate relative to the projection member 33 between the first and second positions associated with installed to uninstalled configurations, respectively.

Figure 11A:
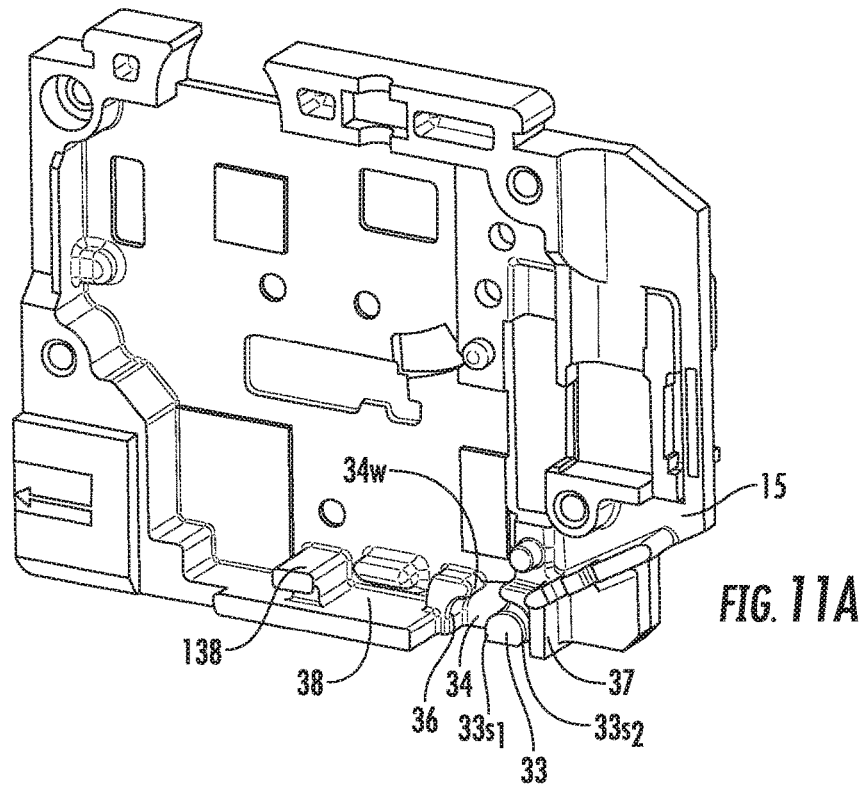
FIG. 11A is a side perspective view of a middle base of the circuit breaker shown in FIG. 1A according to embodiments of the present invention.

In the embodiment shown in FIG. 7 and FIG. 9, the biasing member 70 comprises a coil spring 70c. The biasing member 70 can have a first end portion 71 that is attached to the plug-on neutral clip 50, typically via an aperture 52 in the crown 50c (FIG. 10), and a second opposing end portion 73 that is coupled to the housing 10h. The second end portion 73 can be stationary and affixed to an anchor member 138 in the housing. The anchor member 138 can be a molded feature on a wall of the middle base 15 (FIG. 11A). The first end portion 71 of the biasing member 70 can extend and retract based on the position and/or orientation of the clip 50.

Referring to FIGS. 7-10, the neutral bus 150 can have a foot 150f that extends out of the housing 10h. The breaker neutral bus 150 can be configured so that the foot 150f extends below an adjacent (line side facing) leg $51_1$ of the plug-on neutral clip 50. The load facing side leg $51_2$ can be curvilinear and be longer than the other side $51_1$. The crown 50c can comprise an aperture 52 that receives the first end portion 71 of the biasing member 70. The aperture 52 can reside offset from the center (back to front) and reside closer to the load side 10l of the breaker 10. The plug-on neutral clip 50 can be configured to force a lower end portion 150e of the breaker neutral bus 150 against the neutral bus bar 125 of the load center 100. The upper end portion 150u of the neutral bus bar 150 can be planar and extend (substantially) orthogonal to the leg 150l thereof. In position, as shown in FIG. 7, the upper end portion 150u of the breaker neutral bus 150 can extend into the collar assembly 95. The neutral bus 150 is a conductor that carries electrical current from the plug-on connection at the panel neutral bar 125 (FIG. 6, for example) to the collar 95 (FIG. 7, for example) where the house wiring is secured. Thus, the plug-on neutral clip 50 can assure a sufficient clamping force for electrical connection to carry current from the leg 150l to the panel neutral bar 125.

As shown in FIGS. 7, 8 and 10, the neutral bus 150 can include a leg 150l that has a narrow segment 150n under the upper portion 150u and above the lower end portion 150e and the foot 150f that can be held in a stepped segment 50s of the crown 50c. The width "w" of the crown 50c can narrow from the second leg $51_2$ to the first leg $51_1$. The foot 150f can extend inwardly toward the line side under the first leg 511 of the clip 50. The narrow segment 150n of the leg 150l can have a bent or curvilinear shape when unloaded from the circuit breaker 10 (FIG. 8) and can flex in response to forces applied by the leg $51_1$ of the clip 50 and/or neutral bus 125.

As shown in FIG. 6, properly installed, the lower end portion 150e of the breaker neutral bus 150 above the foot 150f can abut the neutral bus bar 125 of the load center 100 and the inner clip leg $51_1$ can abut the lower end portion of the breaker bus 150 while the other leg $51_2$ abuts an opposing side of the neutral bus bar 125.

Referring to FIG. 11A, the middle base 15 of the housing 10h can include a recessed compartment 38 that extends between an anchor member 138 and the projection member 33 that is coupled to the plug-on neutral clip 50. The projection member 33 can include a line facing side $33s_1$ and a load facing side $33s_2$. The middle base 15 can include an open channel 34 and walls 36, 37 on each side of the open channel 34. The outer wall 37 can reside closer to the projecting member 33 than the inner wall 36. The open channel 34 can have an inner wall segment 34w that is curvilinear, typically corresponding to a shape of an inner end portion (line facing side) of the crown 50c, that can abut or trap the crown 50c when in the installed orientation (FIG. 6). The legs 51 of the plug-on neutral clip 50 can both extend out of the open channel 34 while the crown 50c remains in the housing 10h in both the first and second positions.

Figure 11B:
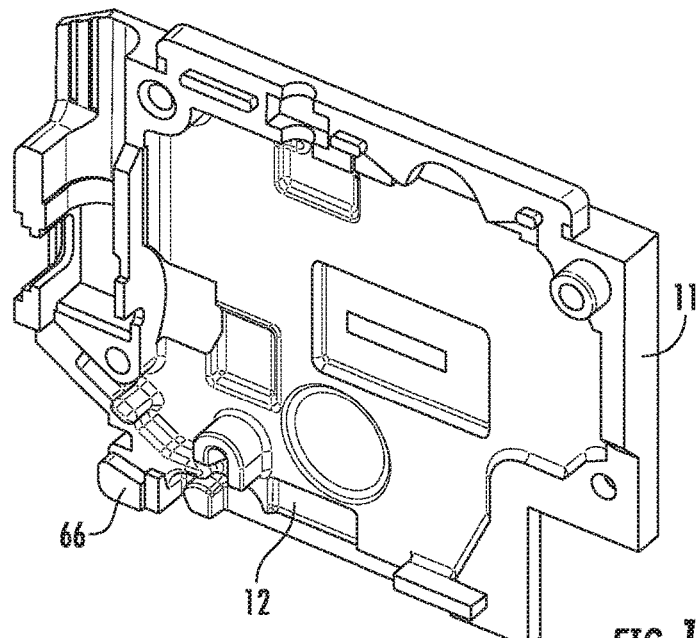
FIG. 11B is a side perspective view of a top cover of the circuit breaker shown in FIG. 1A according to embodiments of the present invention.

As shown in FIG. 11B, the top cover 11 can include the external projection 66 and can also include an internal elongate recessed compartment 12 that aligns with the anchor member 138 and/or the compartment 38.

FIGS. 12-20B illustrate another example embodiment of a breaker 10 with a biasing member 70'. In this embodiment, the biasing member 70' comprises a leaf spring 70l.

Figure 12:
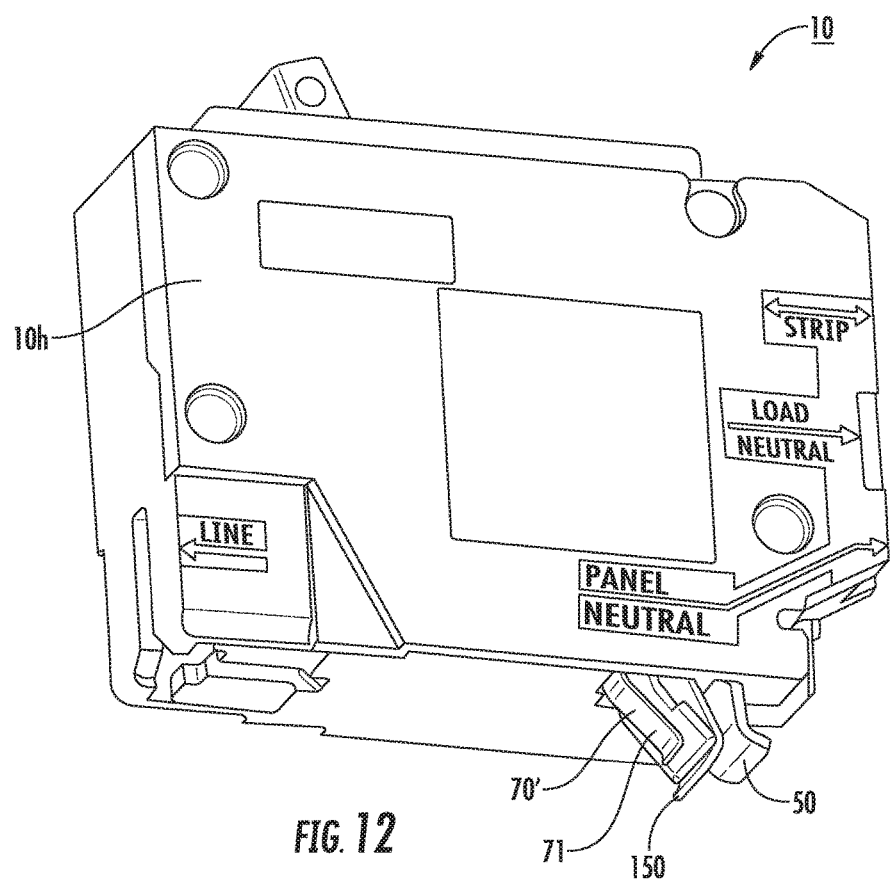
FIG. 12 is a side, rear perspective view of another embodiment of a circuit breaker according to embodiments of the present invention.
Figure 16:
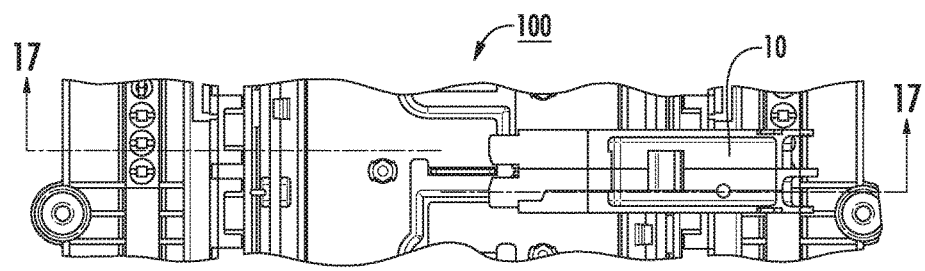
FIG. 16 is a partial view of the circuit breaker of FIG. 12 over a neutral bus bar of the load center of FIG. 2 according to embodiments of the present invention.
Figure 17:
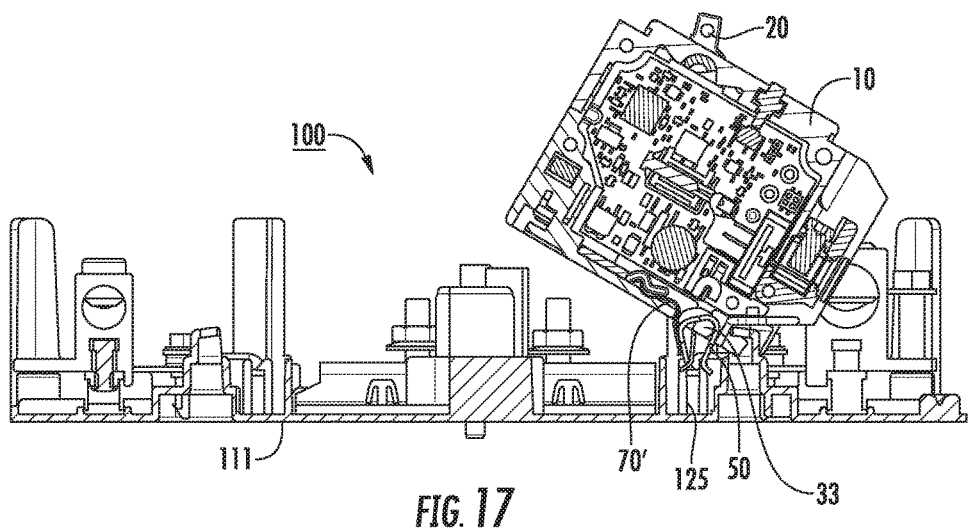
FIG. 17 is a side section view of the circuit breaker in a first position relative to the load center taken along line 17-17 of FIG. 16 (pre-installed or improperly installed) according to embodiments of the present invention.
Figure 18:
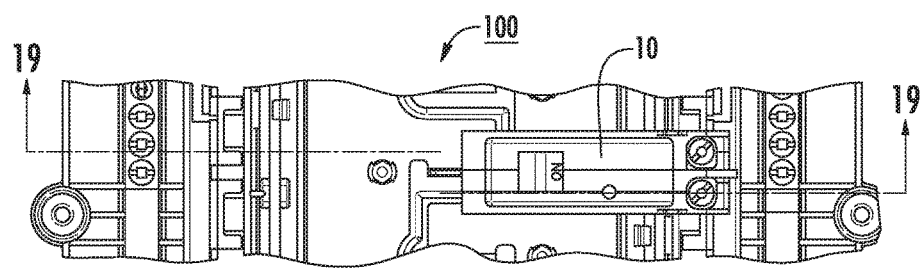
FIG. 18 is a partial view of the circuit breaker of FIG. 12 in a second position relative to the load center (properly coupled to the neutral bus bar of the load center of FIG. 2) according to embodiments of the present invention.
Figure 19:
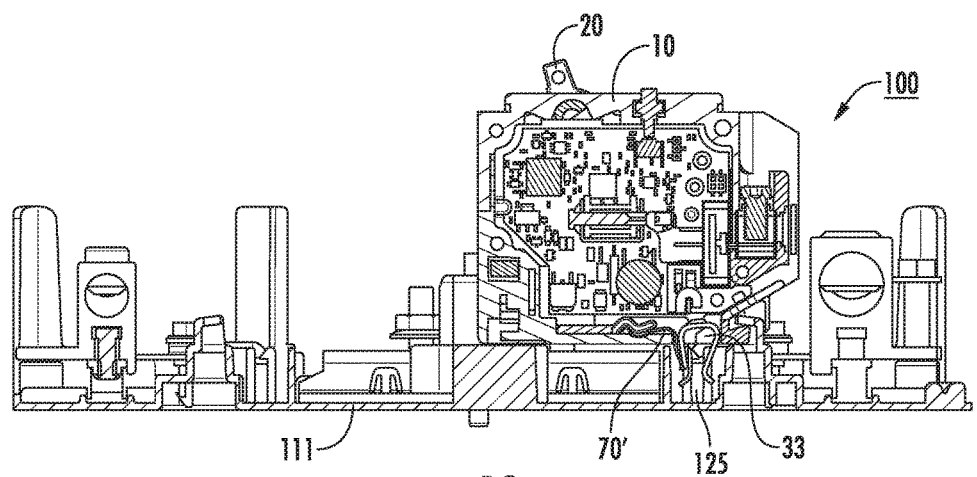
FIG. 19 is a side section view of the circuit breaker and load center taken along line 19-19 of FIG. 18 according to embodiments of the present invention.

FIGS. 12 and 13 show that the biasing member 70 can have a first end portion 71 that extends out of the housing 10h and abuts a first leg $51_1$ of the clip 50. The opposing end portion 73 can be held trapped in the housing 10h under an anchor member 138'. FIG. 14 illustrates that the biasing member 70' can have a curvilinear shape. FIG. 15 illustrates that the plug-on neutral clip 50 does not require an aperture to connect to the biasing member 70'.

FIGS. 16-19 illustrate the rotation-dependent positions of the clip 50 and neutral bus 150, similar to FIGS. 3-6 as discussed above.

Figure 20A:
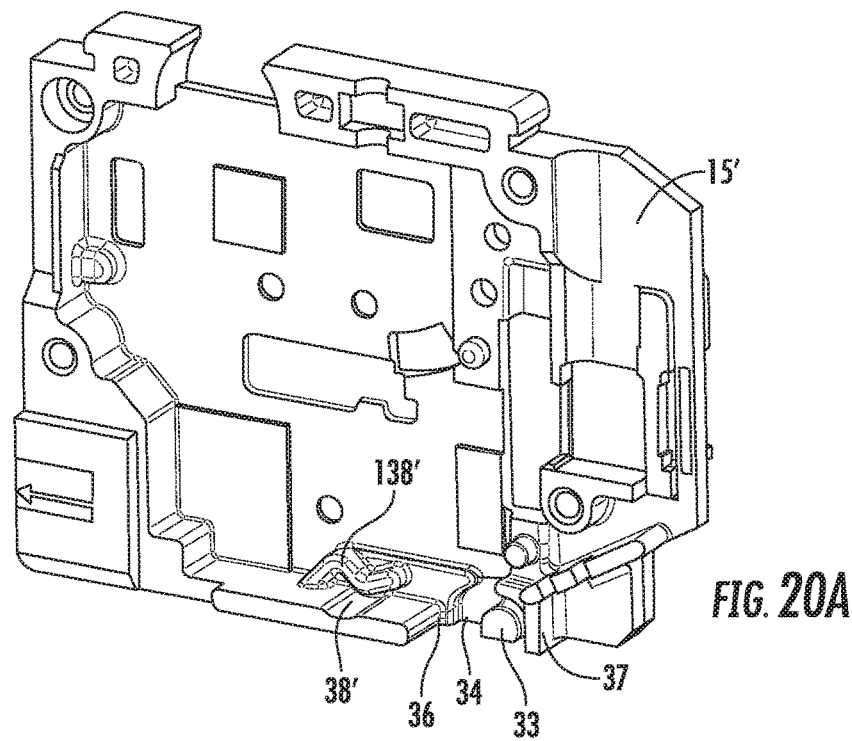
FIG. 20A is a side perspective view of a middle base of the circuit breaker shown in FIG. 12 according to embodiments of the present invention.
Figure 20B:
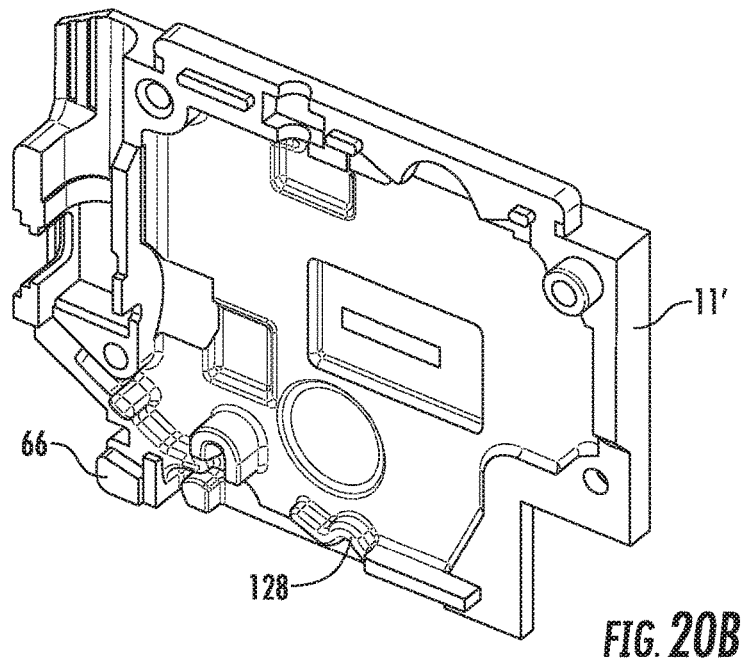
FIG. 20B is a side perspective view of a top cover of the circuit breaker shown in FIG. 12 according to embodiments of the present invention.

FIG. 20A illustrates that the middle base 15' can have a shaped anchor member 138' over a recessed wall segment 38' that holds the second end portion 73 of the biasing member 70'. The shaped anchor member 138' can have a curvilinear shape and reside above an open cavity space 38'. FIG. 20B illustrates that the top cover 11' can comprise a curvilinear projection 128 with a shape corresponding to the anchor member 138'. The second end portion 73 of the biasing member 70' can be held between the cover and middle base curvilinear projections 128, 138'.

Figure 21:
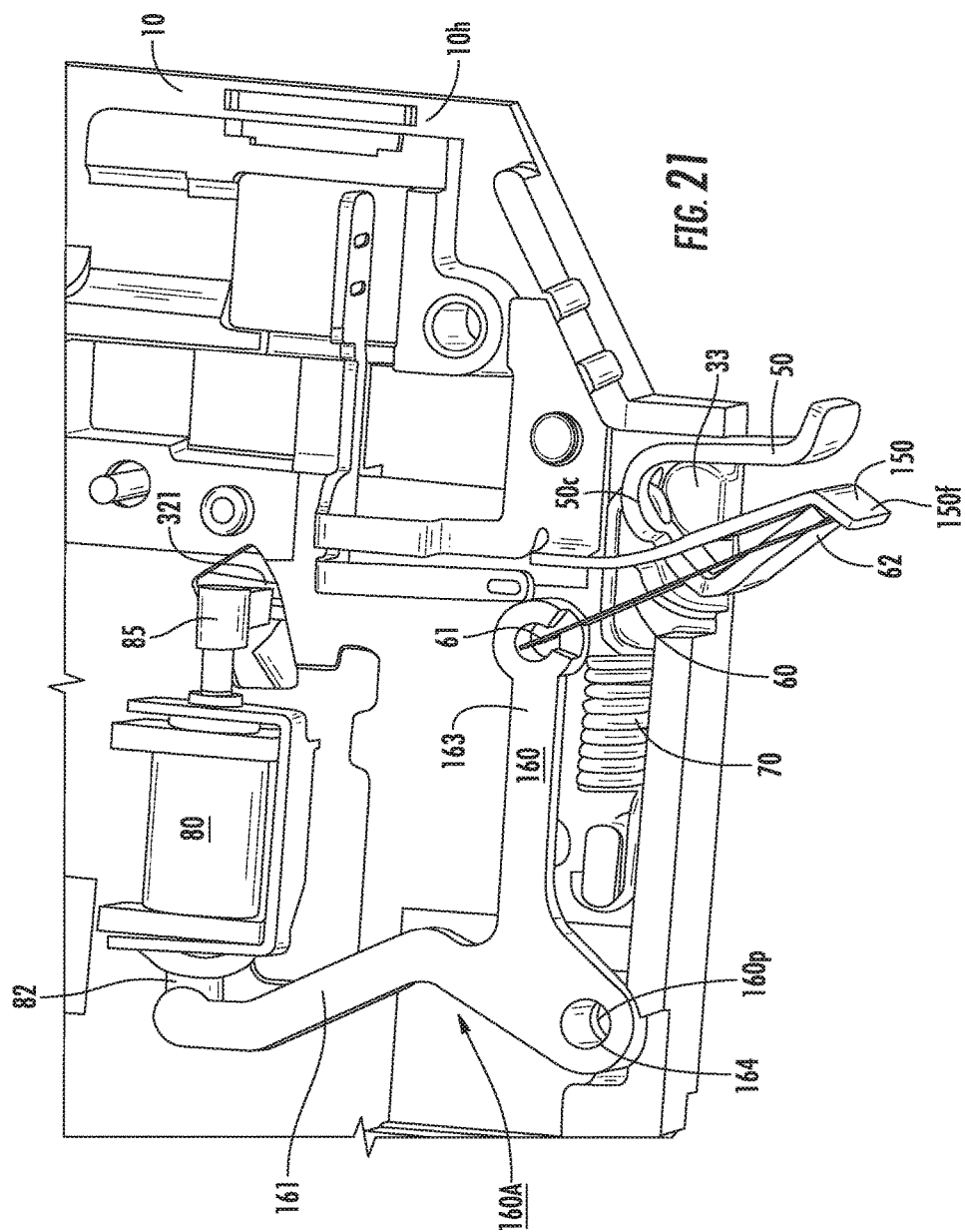
FIG. 21 is an enlarged partial view of a circuit breaker similar to that of FIG. 1A and that includes an onboard mechanical coupler according to embodiments of the present invention.

Referring to FIG. 21, in some particular embodiments, the breaker 10 can optionally include a lockout assembly 160A with a mechanical coupler 160 that is coupled to a latch 321 that controllably blocks the breaker mechanism from latching to thereby block conduction from a load side to a line side when in a lockout state, depending on an orientation of the mechanical coupler 160 that, in turn, depends on an orientation of the plug-on neutral clip 50.

In the locked out state provided by the lockout assembly 160A, even if a user attempts to activate the breaker 10 using a handle input 20 to turn "ON" the breaker, there is no conduction allowed as the mechanical coupler 160 is in a configuration that forces the latch 321 to block a latch link due to an improper assembly or installation of the plug-on neutral clip 50. The lockout assembly 160A can include a link member 60 which can be configured as a curvilinear metallic member, optionally comprising stainless steel. In some embodiments, the link member 60 can comprise a first end portion 61 that may include a semi-circular or circular end that is held captured in a semi-circular or circular channel 163c in a free end 163f of a second arm 163 of the mechanical coupler 160. A second end portion 62 of the link member 60 is spaced apart from the first end portion 61 and can be attached to the plug-on neutral clip 50.

The end of a first arm 161 of the mechanical coupler 160 can travel back and forth a distance relative to the solenoid 80 to move a plunger 82 and/or plunger extension 85. The end of the second arm 163 can move to a first position (an up position relative to a second position) in the housing 10h with the plunger 82 extended and/or the plunger extension 85 retracted and down to the second position in the housing 10h toward the plug-on neutral clip 50 with the plunger 82 retracted and/or the plunger extension 85 extended.

The breaker 10 can be an AFCI or GFCI breaker, including a Type BR or CH breaker, or dual purpose AFCI/GFCI and/or may be a molded case circuit breaker.

Figure 22:
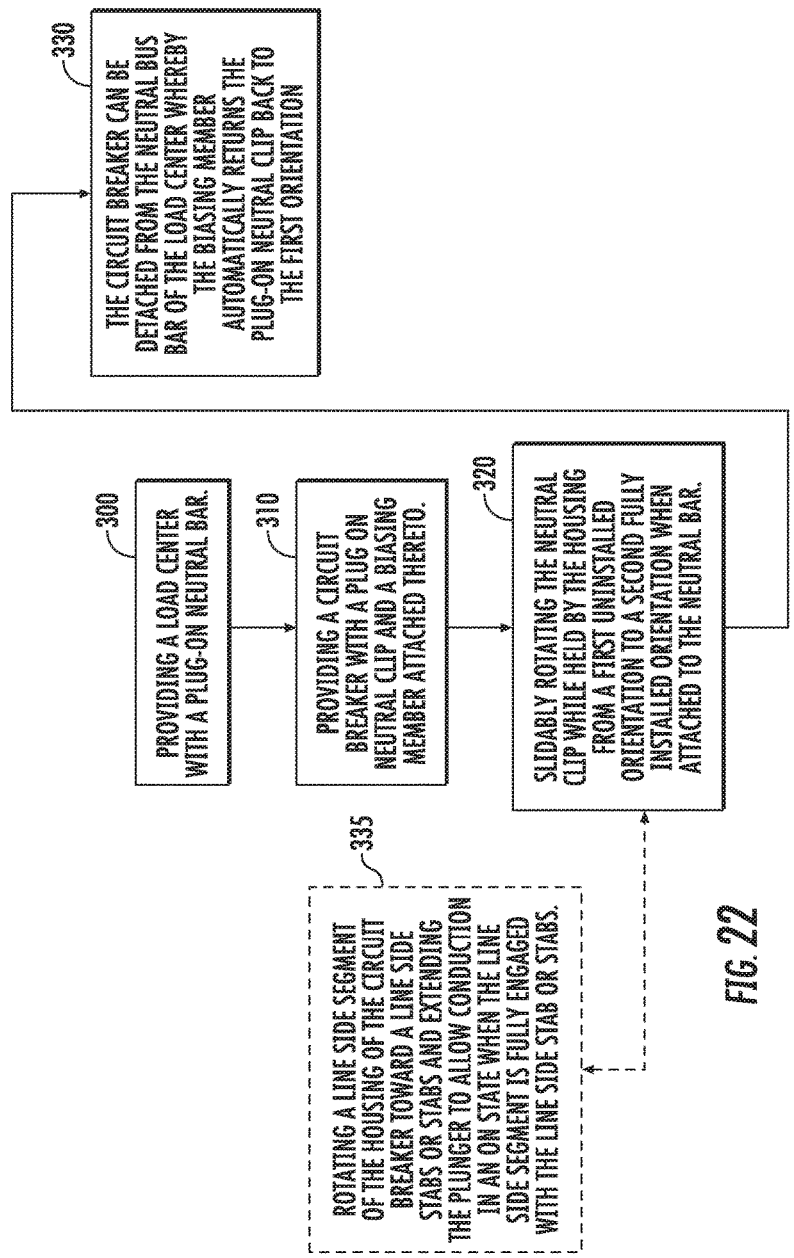
FIG. 22 is a block diagram of a flow chart of operations that can be used to provide an electrical connection of a circuit breaker to a load center according to embodiments of the present invention.

FIG. 22 illustrates a method for biasing a neutral-plug on clip to have a first defined orientation and allow the clip to move between first and second orientations. As shown, a load center with at least one neutral bus bar is provided (block 300). A circuit breaker with a plug on neutral clip and a biasing member attached thereto is also provided (block 310). The neutral clip slidably rotates while held by the housing from a first uninstalled orientation to a second fully installed orientation when attached to the neutral bar (block 320). The circuit breaker can be detached from the neutral bus bar of the load center whereby the biasing member automatically returns the plug-on neutral clip back to the first orientation (block 330).

A line side segment of the housing of the circuit breaker can be rotated inward toward a line side stab or stabs and the plunger can be extended (and the plunger extension facing a latch can be concurrently retracted) a distance relative to the trip solenoid to allow conduction in an ON state when the line side segment is fully engaged with the line side stab or stabs (block 335).

The breaker 10 can be a branch breaker in the load center 10. The load centers 100 can be residential or industrial load centers. The circuit breaker 10 can be a Type BR or CH AFCI or GFCI breaker or dual purpose AFCI/GFCI.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A circuit breaker comprising:
   a housing;
   a neutral bus held by the housing with a first end portion extending out of the housing;
   a plug-on neutral clip slidably and rotably held by the housing, wherein the plug-on neutral clip comprises a crown held in the housing and first and second spaced apart legs extending out from the housing, the first leg adjacent the first end portion of the neutral bus, wherein the plug-on neutral clip and the first end portion of the neutral bus are configured to move between a first position associated with an uninstalled circuit breaker orientation and a second position associated with a fully installed circuit breaker orientation, and wherein the crown and the first and second legs of the plug-on neutral clip slidably rotate in concert to move between the first position and the second position; and
   a biasing member coupled to the plug-on neutral clip and held in the housing, wherein the biasing member is configured to return the plug-on neutral clip and the first end portion of the neutral bus back to the first position from the second position when the plug-on neutral clip is detached from a neutral bus bar of a load center.

2. The circuit breaker of claim 1, further comprising a projection member held by the housing and an open channel surrounding the projection member, wherein the crown is held by the projection member and the first and second legs extend out of the housing through the open channel, and wherein the first end portion of the neutral bus resides external of the housing between the first and second legs of the plug-on neutral clip and an opposing internal end portion of the neutral bus extends above the crown of the plug-on neutral clip and resides in the housing.

3. The circuit breaker of claim 1, further comprising an external outwardly facing projection that is perpendicular to a wall of the housing surrounding the open channel and that is configured to engage a foot held by a backpan of a load center to thereby allow the circuit breaker to rotate toward the backpan of the load center during installation.

4. The circuit breaker of claim 2, wherein the projection member has an arcuate perimeter, and wherein the biasing member comprises a spring that is directly attached to the crown of the plug-on neutral clip.

5. A circuit breaker comprising:
   a housing;
   a neutral bus held by the housing with a first end portion extending out of the housing;
   a plug-on neutral clip slidably held by the housing, wherein the plug-on neutral clip comprises a crown held in the housing and first and second spaced apart legs extending out from the housing, the first leg adjacent the first end portion of the neutral bus, wherein the plug-on neutral clip and first end portion of the neutral bus are configured to move between a first position associated with an uninstalled circuit breaker orientation and a second position associated with a fully installed circuit breaker orientation;
   a biasing member coupled to the plug-on neutral clip and held in the housing, wherein the biasing member is configured to return the plug-on neutral clip and the first end portion of the neutral bus back to the first position from the second position when the plug-on neutral clip is detached from a neutral bus bar of a load center; and a projection member held by the housing and an open channel surrounding the projection member, wherein the crown is held by the projection member and the first and second legs extend out of the housing through the open channel, wherein the open channel is bounded by a wall segment that has an arcuate portion that can slidably engage a line side facing end portion of the crown of the plug-on neutral clip in the second position and that is spaced apart from the line side facing end portion of the crown of the plug-on neutral clip in the first position.

6. The circuit breaker of claim 1, wherein the biasing member resides in the housing in a compartment of a middle base of the housing facing a top cover of the housing, wherein the plug-on neutral clip resides closer to a load side of the circuit breaker than a line side of the circuit breaker, and wherein the biasing member resides on a side of the plug-on neutral clip facing the line side of the circuit breaker.

7. A circuit breaker comprising:

a housing;

a neutral bus held by the housing with a first end portion extending out of the housing;

a plug-on neutral clip slidably held by the housing, wherein the plug-on neutral clip comprises a crown held in the housing and first and second spaced apart legs extending out from the housing, the first leg adjacent the first end portion of the neutral bus, wherein the plug-on neutral clip and the first end portion of the neutral bus are configured to move between a first position associated with an uninstalled circuit breaker orientation and a second position associated with a fully installed circuit breaker orientation; and a biasing member coupled to the plug-on neutral clip and held in the housing, wherein the biasing member is configured to return the plug-on neutral clip and the first end portion of the neutral bus back to the first position from the second position when the plug-on neutral clip is detached from a neutral bus bar of a load center, wherein the biasing member comprises a coil spring with a first end portion coupled to the crown of the plug-on neutral clip and an opposing second end portion coupled to the housing, and wherein, at least in the uninstalled orientation of the circuit breaker, the coil spring resides in the housing entirely on a side of the plug-on neutral clip facing a line side of the circuit breaker.

8. A circuit breaker comprising:

a housing;

a neutral bus held by the housing with a first end portion extending out of the housing;

a plug-on neutral clip slidably held by the housing, wherein the plug-on neutral clip comprises a crown held in the housing and first and second spaced apart legs extending out from the housing, the first leg adjacent the first end portion of the neutral bus, wherein the plug-on neutral clip and first end portion of the neutral bus are configured to move between a first position associated with an uninstalled circuit breaker orientation and a second position associated with a fully installed circuit breaker orientation; and a biasing member coupled to the plug-on neutral clip and held in the housing, wherein the biasing member is configured to return the plug-on neutral clip and the first end portion of the neutral bus back to the first position from the second position when the plug-on neutral clip is detached from a neutral bus bar of a load center, wherein the biasing member comprises a coil spring with a first end portion coupled to the crown of the plug-on neutral clip and an opposing second end portion coupled to the housing, and wherein the crown comprises an aperture, and wherein the first end portion of the biasing member extends through the aperture to couple the biasing member to the crown of the plug-on neutral clip.

9. A circuit breaker comprising:

a housing;

a neutral bus held by the housing with a first end portion extending out of the housing;

a plug-on neutral clip slidably held by the housing, wherein the plug-on neutral clip comprises a crown held in the housing and first and second spaced apart legs extending out from the housing, the first leg adjacent the first end portion of the neutral bus, wherein the plug-on neutral clip and the first end portion of the neutral bus are configured to move between a first position associated with an uninstalled circuit breaker orientation and a second position associated with a fully installed circuit breaker orientation; and a biasing member coupled to the plug-on neutral clip and held in the housing, wherein the biasing member is configured to return the plug-on neutral clip and the first end portion of the neutral bus back to the first position from the second position when the plug-on neutral clip is detached from a neutral bus bar of a load center, wherein the biasing member comprises a leaf spring with a first end portion coupled to the plug-on neutral clip and an opposing second end portion trapped in the housing, and wherein the first end portion of the leaf spring extends out of the housing.

10. The circuit breaker of claim 9, wherein the second end portion of the leaf spring is held under a curvilinear anchor member in the housing.

11. The circuit breaker of claim 9, wherein the first end portion of the leaf spring is planar and parallel to the first leg of the plug-on neutral clip.

12. The circuit breaker of claim 1, wherein the first leg of the plug-on neutral clip is shorter than the second leg of the plug-on neutral clip, and wherein a foot of the neutral bus extends inwardly under the first leg of the plug-on neutral clip.

13. The circuit breaker of claim 1, wherein the neutral bus has a first portion that is held in the housing and couples to a collar assembly, wherein the neutral bus has a leg with a narrow segment that is more narrow than a second end portion with a foot, wherein the crown of the plug-on neutral clip has a width dimension that narrows from a load facing side to a line facing side at a stepped segment, and wherein the narrow segment of the neutral bus extends through the stepped segment of the crown and is held in a curvilinear configuration when the plug-on neutral clip is in the first position.

14. The circuit breaker of claim 1, wherein the circuit breaker is a plug-on neutral type BR or CH circuit breaker or a dual purpose AFCI/GFCI.

15. A circuit breaker comprising:

a housing;

a neutral bus held by the housing with a first end portion extending out of the housing;

a plug-on neutral clip slidably held by the housing, wherein the plug-on neutral clip comprises a crown held in the housing and first and second spaced apart legs extending out from the housing, the first leg adjacent the first end portion of the neutral bus, wherein the plug-on neutral clip and the first end portion of the neutral bus are configured to move between a first position associated with an uninstalled circuit breaker orientation and a second position associated with a fully installed circuit breaker orientation; and a biasing member coupled to the plug-on neutral clip and held in the housing, wherein the biasing member is configured to return the plug-on neutral clip and the first end portion of the neutral bus back to the first position from the second position when the plug-on neutral clip is detached from a neutral bus bar of a load center, wherein the load center comprises a wall holding a neutral bus bar with planar sidewalls oriented perpendicular to and projecting out from the wall toward a front of the load center and the wall also holding one or more line side stabs, wherein the plug-on neutral clip slidably engages the neutral bus bar, and wherein one or more terminals at a line side of the housing engage the one or more line side stabs.

16. A load center comprising:
a circuit breaker, comprising:
a housing;
a neutral bus held by the housing with a first end portion extending out of the housing;

a plug-on neutral clip slidably held by the housing, wherein the plug-on neutral clip comprises a crown held in the housing and first and second spaced apart legs extending out from the housing, the first leg adjacent the first end portion of the neutral bus, wherein the plug-on neutral clip and first end portion of the neutral bus are configured to move between a first position associated with an uninstalled circuit breaker orientation and a second position associated with a fully installed circuit breaker orientation; and a biasing member coupled to the plug-on neutral clip and held in the housing, wherein the biasing member is configured to return the plug-on neutral clip and the first end portion of the neutral bus back to the first position from the second position when the plug-on neutral clip is detached from a neutral bus bar of the load center, wherein the load center comprises a wall holding a neutral bus bar and one or more line side stabs, wherein the plug-on neutral clip slidably engages the neutral bus bar, and wherein one or more terminals at a line side of the housing engage the one or more line side stabs, wherein the circuit breaker is configured to be rotatably attached to a wall panel of the load center, and wherein once the plug-on neutral clip slidably engages the neutral bus bar, rotation of a line side of the housing of the circuit breaker into the one or more line stabs to a fully installed orientation causes the plug-on neutral clip to push a segment of the first end portion of the neutral bus of the circuit breaker against the load center neutral bus bar.

17. A method of orienting a plug-on neutral clip of a circuit breaker, comprising:
providing a load center with at least one neutral bus bar;

providing a circuit breaker with a plug-on neutral clip and a biasing member coupled thereto;

attaching the plug-on neutral clip to one or more of the at least one neutral bus bar;

slidably rotating the plug-on neutral clip while a crown thereof is held inside a housing of the circuit breaker and first and second legs thereof extend outside the housing from a first position associated with an uninstalled orientation to a second position associated with a fully installed orientation, wherein the crown and the first and second legs of the plug-on neutral clip slidably rotate in concert as the plug-on neutral clip slidably rotates between the first position and the second position; and then detaching the circuit breaker from the load center whereby the biasing member automatically returns the plug-on neutral clip back to the first position associated with the uninstalled orientation.

18. The method of claim 17, wherein the circuit breaker further comprises a neutral bus with a leg that extends out of the housing and that resides between the first and second legs of the plug-on neutral clip and that also engages the plug-on neutral clip, wherein the attaching step comprises forcing the leg against a respective neutral bar using the plug-on neutral clip, and wherein the detaching step further comprises forcing the leg of the neutral bus to return to the first position associated with a pre-installation orientation as the uninstalled orientation, wherein the housing comprises a projection member and an open channel surrounding the projection member, wherein the crown is slidably rotatably held by the projection member and the first and second legs extend out of the housing through the open channel, and wherein the first end portion of the neutral bus resides external of the housing between the first and second legs of the plug-on neutral clip and an opposing internal end portion of the neutral bus extends above the crown of the plug-on neutral clip and resides in the housing.

19. The method of claim 17, further comprising rotating a line side of the housing of the circuit breaker inward toward a line side stab or stabs after attaching the plug-on neutral clip to the one or more neutral bus bar causing the sliding rotation of the plug-on neutral clip to the second position, wherein the first leg of the plug-on neutral clip is shorter than the second leg of the plug-on neutral clip, and wherein a foot of the neutral bus extends inwardly under the first leg of the plug-on neutral clip.

20. A method of orienting a plug-on neutral clip of a circuit breaker, comprising:
providing a load center with at least one neutral bus bar;
providing a circuit breaker with a plug-on neutral clip and a biasing member coupled thereto;
attaching the plug-on neutral clip to one or more of the at least one neutral bus bar;
slidably rotating the plug-on neutral clip while a crown thereof is held inside a housing of the circuit breaker and first and second legs thereof extend outside the housing from a first position associated with an uninstalled orientation to a second position associated with a fully installed orientation; and then
detaching the circuit breaker from the load center whereby the biasing member automatically returns the plug-on neutral clip back to the first position associated with the uninstalled orientation,
wherein the slidably rotating is carried out by sliding the crown upward and inward about a projection with a curved perimeter.

* * * * *

UNITED STATES PATENT AND TRADEMARK OFFICE
CERTIFICATE OF CORRECTION

Page 1 of 1

PATENT NO.         : 10,290,450 B1
APPLICATION NO.    : 15/840360
DATED              : May 14, 2019
INVENTOR(S)        : Betances Sansur et al.

It is certified that error appears in the above-identified patent and that said Letters Patent is hereby corrected as shown below:

In the Specification

Column 8, Line 41: Please correct "701" to read -- 70*l* --

Signed and Sealed this
Third Day of September, 2019

Andrei Iancu
*Director of the United States Patent and Trademark Office*